United States Patent [19]

Pruett et al.

[11] Patent Number: 4,740,581

[45] Date of Patent: Apr. 26, 1988

[54] CONDENSATION COPOLYMERS CONTAINING COPOLYMERIZED ISOQUINOLINE DERIVATIVE COLORANTS AND PRODUCTS THEREFROM

[75] Inventors: Wayne P. Pruett, Kingsport; Samuel D. Hilbert, Jonesborough; Max A. Weaver, Kingsport, all of Tenn.

[73] Assignee: Eastman Kodak Company, Rochester, N.Y.

[21] Appl. No.: 17,950

[22] Filed: Feb. 24, 1987

[51] Int. Cl.[4] .................... C08G 69/44; C08G 73/16
[52] U.S. Cl. ............................. 528/289; 524/602; 528/288
[58] Field of Search ............... 524/602; 528/288, 289

[56] References Cited
U.S. PATENT DOCUMENTS

| | | | |
|---|---|---|---|
| 4,284,729 | 9/1981 | Cross et al. | 521/158 |
| 4,359,570 | 11/1982 | Davis et al. | 528/289 |
| 4,371,690 | 2/1983 | Anderson et al. | 528/190 |
| 4,377,669 | 3/1983 | Zweifel et al. | 525/445 |
| 4,456,746 | 6/1984 | Horner | 528/128 |
| 4,523,008 | 6/1985 | Vogl et al. | 528/288 |

*Primary Examiner*—Lucille M. Phynes
*Attorney, Agent, or Firm*—William P. Heath, Jr.; John F. Stevens

[57] ABSTRACT

Condensation polymers including linear polyester, unsaturated polyester, and polycarbonate types, wherein certain 3H-dibenzo-[f,ij] isoquinoline-2,7-dione colorants are copolymerized (condensed) into the polymer to impart a wide range of colors from yellow to blue thereto. These colorants are fast to ultraviolet and visible light, are thermally stable and nonsublimable at the polymer processing (includes preparation) temperatures, and are nonextractable therefrom, rendering the polymers particularly suitable for use as beverage bottles and food, pharmaceutical and cosmetic containers, as well as in producer colored fibers.

The colorants have the formula

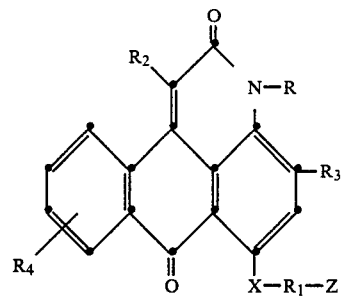

wherein: X is —O—, —S— or —NH—; —X—$R_1$—Z in combination is hydrogen or halogen; $R_1$ is selected from alkyl, aryl, cycloalkyl or the like, and when X is —O— or —NH—, —$R_1$—Z also can be hydrogen; each of $R_1$, Rhd 2, $R_3$ and $R_4$ is hydrogen or an organic substituent; and wherein the molecule carries at least one condensable group.

12 Claims, No Drawings

CONDENSATION COPOLYMERS CONTAINING COPOLYMERIZED ISOQUINOLINE DERIVATIVE COLORANTS AND PRODUCTS THEREFROM

TECHNICAL FIELD

This invention concerns condensation polymers including linear polyester, unsaturated polyester, and polycarbonate types, wherein certain 3H-dibenzo-[f,ij] isoquinoline-2,7-dione colorants defined below are copolymerized (condensed) into the polymer to impart a wide range of colors from yellow to blue thereto. These colorants are fast to ultraviolet and visible light, are thermally stable and nonsublimable at the polymer processing (includes preparation) temperatures, and are nonextractable therefrom, rendering the polymers particularly suitable for use as beverage bottles and food, pharmaceutical and cosmetic containers, as well as in producer colored fibers.

The present colorants in terms of their condensed moieties are useful in total weight concentrations (of single moiety or mixtures thereof), given herein in parts per million (ppm), ranging from about 10 to about 20,000, preferably from about 20 to about 5,000 ppm, i.e., parts by weight of moiety per million parts by weight of final polymer. Other colorants such as pigments, disperse dyes and the like may also be used admixed with the polymer, or dyed onto fiber thereof to vary the color shade as desired.

Heretofore, many copolymerizable colorant compounds have been disclosed in the prior art such as shown in U.S. Pat. No. 3,372,138 wherein in Example 50 a compound similar to applicants is shown but which carries a carboxy group ortho to the —NH— moiety. Such a compound is not commercially feasible since it is extremely difficult to prepare.

DISCLOSURE OF INVENTION

The present linear polymers are thermoplastic molding or fiber grade having an I.V. of from about 0.4 to about 1.2, and preferably are polyesters wherein the acid moiety is comprised of at least about 50 mol % terephthalic acid residue, and the glycol moiety at least about 50 mol % ethylene glycol or 1,4-cyclohexanedimethanol residue, and containing a total of from about 10 to about 20,000 ppm of one or a mixture of the present isoquinoline derivative colorants defined below. The term "acid" as used herein with respect to both the linear and unsaturated polyesters includes their various reactive derivatives such as dimethylterephthalate, anhydrides and the like. A highly preferred polyester within this preferred group is comprised of from about 75 to 100 mol % terephthalic acid residue and from about 75 to 100 mol % ethylene glycol residue.

In accordance with the present invention, the present colorants preferably have molecular weights of from about 400 to about 800 although higher molecular weights are also operable, and contain one or more groups which condense during condensation or polycondensation to enter the moiety into the polymer chain. These groups include hydroxyl, carboxyl, carboxylic ester, acid halide and the like. As aforesaid, these moieties are thermally stable at polymer processing conditions, which includes polycondensation temperatures of up to about 300° C. which are used, for example, in the preparation of polyesters such as poly(ethylene terephthalate) and copolymers of terephthalic acid, ethylene glycol, and 1,4-cyclohexanedimethanol.

The present invention is defined in its broad embodiment as a composition comprising molding or fiber grade condensation polymer having copolymerized therein a total of from 10 to about 20,000 ppm, of the reactant residue moieties of one or a mixture of isoquinoline derivative reactants of the formula

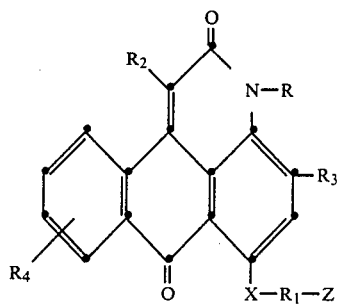

wherein: R is hydrogen, cycloalkyl or alkyl; X is —O—, —S— or —NH—; —X—R$_1$—Z in combination is hydrogen or halogen; R$_1$ is selected from —alkylene—Z, —arylene—Z, —cycloalkylene—Z, —aralkylene—Z, —cycloalkylenealkylene—Z, —alkarylene—Z, —alkylenecycloalkylenealkylene—Z, —alkylenearalkylene—Z, or alkylenecycloalkylene—Z, wherein —Z is selected from hydrogen, —SO$_2$R$^5$, —SO$_2$NR$^5$R$^5$, —NHSO$_2$R$^5$, —N(R$^5$)SO$_2$R$^5$, —N(R$^5$)COR$^5$, —NHCOR$^5$, —OH, —SR$^5$, —OR$^5$, —NHR$^5$, —NR$^5$R$^5$, —SO$_2$NHR$^5$, —CONHR$^5$, —CONR$^5$R$^5$, —OCOR$^5$, —OCO$_2$R$^5$, —OOCNHR$^5$,

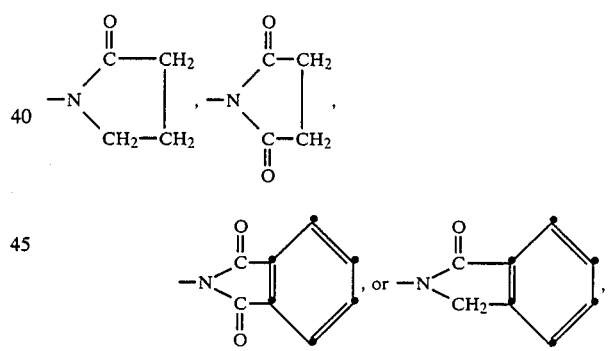

wherein R$^5$ is hydrogen, alkyl, allyl, aryl, cycloalkyl, hydroxyalkyl, alkoxyalkoxyalkyl, alkoxyalkyl, hydroxyalkoxy, hydroxyalkoxyalkoxy, alkoxycarbonylalkyl or carboxyaryl, and when X is —O— or —NH—, —R$_1$—Z in combination also can be hydrogen; R$_2$ is hydrogen, alkyl, aryl, cyano, alkoxycarbonyl, aryloxycarbonyl, aralkoxycarbonyl, cycloalkylalkoxycarbonyl, COCl, carboxy, carbamyl, N-alkylcarbamyl, N,N-dialkylcarbamyl, N-alkyl-N-arylcarbamyl, N-arylcarbamyl, N-cycloalkylcarbamyl, acyl, aroyl, amino, alkylamino, dialkylamino, arylamino, cycloalkylamino, alkoxy, hydroxy, alkylthio or arylthio; each of R$_3$ and R$_4$ is hydrogen, alkyl, halogen or alkoxy; wherein each of the above alkyl, alkylene, aryl, arylene, cycloalkyl or cycloalkylene moieties or portions of a group or radical may be substituted where appropriate with 1-3 substituents selected from hydroxyl, acyloxy, alkyl, cyano, alkoxycarbonyl, alkoxycarbonyloxy, halogen, alkoxy, hydroxyalkoxy, hydroxyalkyl, aryl, aryloxy, or cycloalkyl; and wherein, when the above hydroxyl substituent is absent or multicondensable groups are desired, at least one of R, $R_2$, $R_3$ or $R_4$ carries one or more condensable groups.

In particularly preferred embodiments of the invention: X is —NH— and —$R_1$—Z in combination is aryl, aryl substituted with 1-3 of alkyl, alkoxy, halogen, hydroxyalkyl, hydroxyalkoxy or acylamido, alkyl or alkyl substituted with 1-3 of hydroxyl or acyloxy, cycloalkyl or cycloalkyl substituted with 1-3 of alkyl; —X—$R_1$—Z in combination is H; R is alkyl; $R_2$ is alkoxycarbonyl, hydroxyalkylamino, or cyano; and $R_3$ and $R_4$ are each hydrogen.

In all of the above definitions the alkyl or alkylene moieties or portions of the various groups contain from 1-8 carbons, straight or branched chain, the aryl or arylene nuclei contain from 4-10 carbons, and the cycloalkyl or cycloalkylene nuclei contain from 4-6 carbons. The suffix "ene", is used herein to designate a divalent radical or group, and the term "cycloalkyl" may be used interchangeably with "cycloaliphatic".

The compounds of this invention are suitable for coloring condensation polymers in a wide range of colors from yellow to blue. The colorants have excellent heat stability, do not decompose or sublime under polymerization conditions of high temperature, and are not extractable from the polymers containing them. Polymers of almost any color can be obtained by the combination of the yellow, red, and blue colorants described above and can be formed by blow molding or the like into bottles and/or molded into many useful articles.

The nonextractabilities of the present bis-methine moieties are determined as follows:

Extraction Procedure

All extractions are done in glass containers with distilled solvents under the time and temperature conditions described below. The sample form is ½ inch×2½ inch segments cut from the cylindrical side wall portion of 2-liter bottles. All samples are washed with cold solvent to remove surface contaminants and are exposed using 200 ml. solvent/100 in.$^2$ surface area (2 ml/in.$^2$).

Solvent blanks are run under the same extraction conditions without polymer. In most cases samples were extracted, spiked, with a known amount of additive as a control, and analyzed in duplicates.

Extraction Conditions

1. Water. The samples at room temperature are added to solvent and heated at 250° F. for two hours. Half of the samples are then analyzed and the remainder are placed in a 120° F. oven for 30 days.

2. 50% Ethanol/Water. The samples at room temperature are added to the solvent at room temperature, placed in an oven at 120° F. and analyzed after 24 hours and 30 days.

3. Heptane. The samples at room temperature are added to solvent at room temperature and heated at 150° F. for two hours. Part of the samples are cooled to room temperature and analyzed spectrophotometrically and the remainder are allowed to age at 120° F. for 30 days before analysis.

4. Any suitable analytical technique and apparatus may be employed to determine the amount of bismethine moiety extracted from the polymer. The extractability of the present isoquinoline derivative moieties from the present polymers was found to be essentially nonexistent.

Polyesters useful in this invention include linear, thermoplastic, crystalline, or amorphous materials, produced by conventional techniques using one or more diols and one or more dicarboxylic acids, copolymerized with the present colorants.

Also useful are the unsaturated, curable polyesters which are the polyesterification products of one or more dihydric alcohols and one or more unsaturated dicarboxylic acids or their anhydrides, and the term "polyester resin" is used herein to define the unsaturated polyester dissolved in or admixed with an ethylenically unsaturated monomer. Typical of the unsaturated polyesters is the polyesterification product of (a) 1,4-cyclohexanedimethanol and/or 2,2-dimethyl-1,3-propanediol and optionally an additional dihydric alcohol, such as ethylene glycol, and (b) maleic acid or fumaric acid and an unsaturated hydrogenated aromatic dicarboxylic acid, which when crosslinked with an ethylenically-unsaturated monomer, e.g., styrene, produces a cured polyester resin which has, for example, high thermal resistance, high heat distortion values, excellent electrical and mechanical properties, and excellent resistance to chemicals.

The unsaturated polyester resins may be prepared in the presence of gelation inhibitors such as hydroquinone or the like, which are well known in the art of polyesterification. The esterification may be carried out for example under an inert blanket of gas such as nitrogen in a temperature range of 118°-220° C. for a period of about 6-20 hours until an acid number below 100 and preferably below 50 is obtained, based on milliequivalents of KOH necessary to neutralize 1 gram of the unsaturated polyester. The resulting polyester may be subsequently copolymerized, cross-linked, or cured with "curing amounts" of any of the well-known ethylenically unsaturated monomers used as solvents for the polyester. Examples of such monomers include styrene, alpha-methyl styrene, vinyl toluene, divinyl benzene, chlorostyrene, and the like as well as mixtures thereof. Typically, the mole ratio of such unsaturated monomer to the unsaturated moiety (e.g., maleic acid residue) in the polyester is from about 0.5 to about 3.0, although the "curing amounts" of such monomer can be varied from these ratios.

It is preferred that the unsaturated polyester be prepared from one or more dihydric alcohols, fumaric or maleic acid or mixtures thereof, and up to about 60 mole percent of total acid component of o-phthalic, isophthalic or terephthalic acids or mixtures thereof. Preferred for the dihydric alcohol component is one or a mixture of propylene glycol, neopentyl glycol, 2,2,4-trimethyl-1,3-pentanediol, ethylene glycol, or diethylene glycol. A specific preferred unsaturated polyester is prepared from about 75 to 100 mol % propylene glycol, and as the acid component, from about 75 to 100 mol % o-phthalic and maleic acids in a mole ratio of from about ½ to about 2/1. Typical of these unsaturated polyesters are those disclosed, for example, in U.S. Pat. No. 4,359,570 incorporated herein by reference.

The diol components of the linear polyesters are selected, for example, from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 12 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid and the like. In the polymer preparation, it is often preferable to use a functional acid derivative thereof such as the dimethyl, diethyl, or dipropyl ester of the dicarboxylic acid. The anhydrides of these acids also can be employed where practical.

The preferred linear copolyesters are especially useful for making blow molded bottles or containers for beverages, and for molded food packages and the like. In this regard, certain of these copolyesters are color, I.V., and heat distortion or "hot fill" stable at temperatures of up to about 100° C., when properly heat set and molded articles therefrom exhibit good thin wall rigidity, excellent clarity and good barrier properties with respect to water and atmospheric gases, particularly carbon dioxide and oxygen.

In regard to products having the "hot fill" stability, the most preferred linear polyesters therefor comprise poly(ethylene terephthalate) and this polymer modified with up to about 5 mole % of 1,4-cyclohexanedimethanol, wherein the polymers have been sufficiently heat set and oriented by methods well known in the art to give a desired degree of crystallinity. By definition, a polymer is "hot fill" stable at a prescribed temperature when less than 2% change in volume of a container manufactured therefrom occurs upon filling the same with a liquid at that temperature. For the particular application of blow-molded beverage bottles, the most preferred polyesters have an I.V. of 0.65 to 0.85, and a Tg of >70° C., and film sections cut from the bottle have a Water Vapor Transmission Rate of 1.5 to 2.5 g. mils/100 in.$^2$-24 hrs., a $CO_2$ Permeability of 20–30 cc. mils/100 in.$^2$-24 hrs.-atm., and an $O_2$ Permeability of 4–8 cc. mils/100 in.$^2$-24 hrs.-atm. The Tg is determined by Differential Scanning Calorimetry at a scan rate of 20 Centigrade Degrees/min., the $O_2$ Permeability by the standard operating procedure of a MOCON OXTRAN 100 instrument of Modern Controls, Inc., of Elk River, Minn., and the $CO_2$ Permeability by the standard operating procedure of a MOCON PERMATRAN C II, also of Modern Controls.

Typical polycarbonates useful herein are disclosed in Kirk-Othmer Encyclopedia of Chemical Technology, third edition, Volume 18, pages 479–494, incorporated herein by reference.

The procedures used in preparing the colorants of this invention are largely disclosed in the following literature: C. F. Allen, et al, J.A.C.S., 72, 585 (1950); C. F. Allen and C. V. Wilson, J. Org. Chem., 10, 594 (1945); M. S. Simon and J. B. Rogers, J. Org. Chem., 26, 4353 (1961); Paul Kienzle, French Patent 1,015,963 (1952); CA., 51, 18632; M. V. Kazankov, et al, Zh. Obshch. Khim. (USSR) 34(12), 4124–5 (1964); CA., 62, 9103; L. S. Sadchenko, Zh. Org. Khim. (USSR), 12(5), 1106–9 (1976); CA., 85, 46353a; T. Kanda, et al, Japanese Pat. No. 7100,832 (1971); CA. 74, 11328e; M. V. Kazankov, et al, Khim. Geterotsikl. Soedin. (USSR), 1972, (3), 373; and K. Sivsankaron, et al, J. Sci. Ind. Research (India) 200,265–8 (1961); the teachings of which are incorporated herein by reference.

The examples below will illustrate the procedures involved in the synthesis of the present colorants.

EXAMPLE 1

Preparation of 1-Carbethoxy-3-Methyl-6-(p-Toluidine)-3-H-Dibenzo[f,ij]Isoquinoline-2,7-Dione A mixture of 1-methylamino-4-(p-toluidino) anthraquinone (10.0 g, 0.0292 m), diethyl malonate (25 ml) was heated, in a flask equipped with a stirrer and distillation head, at about 195°–200° C. for 10 hrs., allowing distillate to be removed to maintain a reflux temperature. The mixture was allowed to cool and the product filtered off, washed well with isopropanol, recrystallized from toluene, filtered, and finally washed with isopropanol and hexane. A yield of 6.3 g (49.2% of the theoretical yield) was obtained of dark shiny crystals which imparted a bluish-red color to acetone when dissolved. The product had the following structure:

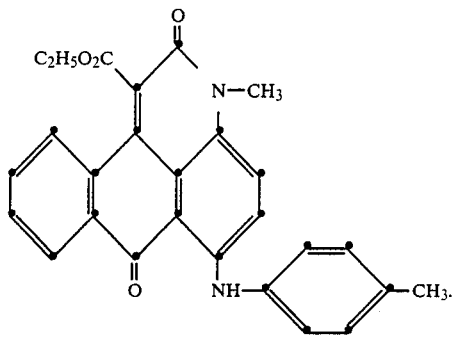

EXAMPLE 2

Preparation of 1-(2-Hydroxyethylamino)-3-Methyl-3H-Dibenz[f,ij]Isoquinoline-2,7-Dione A mixture of 1-chloro-3H-dibenz[f,ij]isoquinoline-2,7-dione (1.8 g), ethanolamine (14 ml), sodium acetate (1 g), and a trace of cupric acetate was heated at 100°–110° C. until reaction appeared to be complete (~1 hr). After cooling, methanol (10 ml) was added to the reaction mixture at about 80° C. Upon further cooling the product crystallized in the form of yellow solid. After being isolated by filtration and recrystallized from methyl Cellosolve, the product melted at 203°–206° C. and had an absorption maxium at 441 nm in the visible spectrum in acetone solution, thus imparting a greenish-yellow color thereto. The structure is as follows:

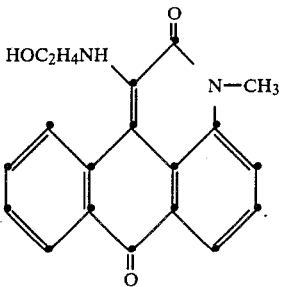

EXAMPLE 3

Preparation of
1-Cyano-6-[4-(2-Hydroxyethyl)Anilino]-3-Methyl-3H-Dibenzo[f,ij]Isoquinoline-2,7-Dione A mixture of 6-bromo-1-cyano-3-methyl-3H-dibenz[f,ij]isoquinoline-2,7-dione (2.0 g), p-aminophenylethanol (15 g), potassium acetate (2.0 g), a trace of cupric acetate, and butanol (10 ml) was heated gradually to about 80° C., held for 5-10 minutes, and then drained into 250 ml of 10% HCl. The solid product was collected by filtration, washed with water, dried in air, and recrystallized twice from nitrobenzene to remove a red impurity and traces of starting material. A yield of 0.65 g of product, which had a visible absorption maximum at 587 nm in acetone, was obtained, thus imparting a reddish-blue color to acetone. The structure is as follows:

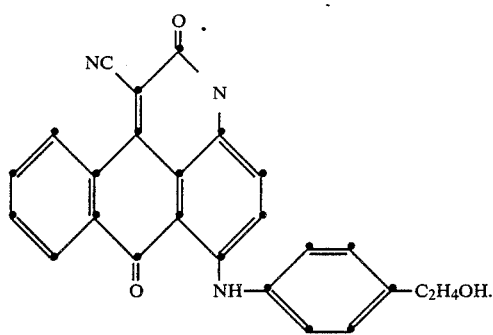

Additional examples of colorants within the present invention are given in Table 1.

BEST MODES FOR CARRYING OUT THE INVENTION

EXAMPLE 4

Preparation of Poly(Ethylene Terephthalate) Copolymerized With 1-Carbethoxy-3-Methyl-6-(m-Toluidino)-3H-Dibenzo[f,ij]Isoquinoline-2,7-Dione A total of 97 g (0.5 mol) dimethyl terephthalate, 62 g (1.0 mol) ethylene glycol, 0.0192 g of 1-carbethoxy-3-methyl-6-(m-toluidino)-3H-dibenzo[f,ij]isoquinoline-2,7-dione, and 0.29 ml of a n-butanol solution of acetyl triisopropyl titanate which contains 0.03 g titanium per ml are weighed into a 500 ml, single-necked, round-bottom flask equipped with a nitrogen inlet, stirrer, vacuum outlet, and condensing flask. The flask and contents are heated at 200° C. in a Belmont metal bath for 60 minutes, at 210° C. for 75 minutes, and at 230° C. for 50 minutes with a nitrogen sweep over the reaction mixture while the ester interchange takes place. The metal bath temperature is increased to 270° C. Vacuum with a stream of nitrogen bleeding into the system is applied slowly over a 10 minute period until the vacuum is reduced to 100 mm Hg. The flask and contents are heated at 270° C. under a vacuum of 100 mm Hg for 30 minutes. The metal bath temperature is increased to 285° C. At 285° C., the vacuum is reduced slowly over a 10 minute period to 4 to 5 mm Hg. The flask and contents are heated at 285° C. under a vacuum of 4 to 5 mm Hg for 25 minutes. Then the vacuum is reduced to 0.3 to 0.5 mm Hg and polycondensation is continued at 285° C. for 16 minutes. The flask is removed from the metal bath and is allowed to cool in nitrogen atmosphere while the polyester crystallizes. The resulting polymer is bluish-red and has an inherent viscosity of 0.64 measured in a 60/40 ratio by weight of phenol/tetrachloroethane at a concentration of 0.5 g per ml. A UV-visible spectrum on amorphous film of the polymer shows a strong absorption peak at 535 nm.

EXAMPLE 5

Preparation of Poly(Ethylene Terephthalate) Copolymerized With 1-(2-Hydroxyethyl Amino)-3-Methyl-3H-Dibenzo[f,ij]Isoquinolin-2,7-Dione The below compounds are placed in a 500 ml, single-necked, round-bottom flask:

97 g (0.5 mol) dimethyl terephthalate;
62 g (1.0 mol) ethylene glycol;
0.0192 g 1-(2-hydroxyethylamino)-3-methyl-3H-dibenzo[f,ij]isoquinoline-2,7-dione; and
0.29 ml of a n-butanol solution of acetyl triisopropyl titanate containing 0.03 g titanium per ml.

The ester interchange and polymerization of this polymer are carried out as in Example 4. The resulting polymer is yellow colored and has an inherent viscosity of 0.61. A UV-visible spectrum on amorphous film of the polymer shows a strong absorption peak at 440 nm.

The inherent viscosities (I.V.) of each of the copolyesters herein are determined according to ASTM D2857-70 procedure in a Wagner Viscometer of Lab Glass Inc. of Vineland, N.J. having a ¼ ml capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation $$\{\eta\}_{0.50\%}^{25° C.} = \frac{\ln \frac{t_s}{t_o}}{C}$$

where:

$\{\eta\}$ = Inherent viscosity at 25° C. at a polymer concentration of 0.5 g./100 ml. of solvent;
ln = Natural logarithm;
$t_s$ = Sample flow time;
$t_o$ = Solvent-blank flow time; and
C = Concentration of polymer in grams per 100 ml. of solvent = 0.50.

The following table gives specific examples of colorants useful in the present invention.

TABLE 1
Substituted 3N—Dibenzo[f,ij]Isoquinoline-2,7-Diones

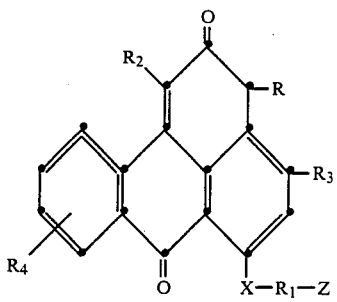

| Ex. No. | R | —X—R₁—Z | R₂ | R₃ | R₄ | Color |
|---|---|---|---|---|---|---|
| 6 | $CH_3$ | $NHC_2H_4OH$ | NC— | H | H | Reddish-Blue |
| 7 | $CH_3$ | NH—⟨C₆H₄⟩—$OC_2H_4OH$ | NC— | H | H | Blue |
| 8 | $CH_3$ | NH—⟨C₆H₂($CH_2OH$)($CH_3$)($CH_2OH$)⟩ | NC— | H | H | Reddish-Blue |
| 9 | $C_2H_5$ | $NHC_2H_4OH$ | $CO_2CH_3$ | H | H | Red |
| 10 | $C_2H_4OH$ | $NHC_2H_5$ | $CO_2C_2H_5$ | H | H | Red |
| 11 | $C_6H_{11}$ | $NHCH_2CH_2CH_2OH$ | $COCH_3$ | H | H | Red |
| 12 | $CH_3$ | NH—⟨C₆H₄⟩—$C_2H_4OH$ | $COCH_3$ | H | H | Red |
| 13 | $CH_2CH_2C_6H_5$ | NH—⟨C₆H₅⟩ | $CON(C_2H_4OH)_2$ | H | H | Red |
| 14 | H | NH—⟨C₆H₅⟩ | $CONHC_2H_4OH$ | H | H | Red |
| 15 | $CH_3$ | $NH_2$ | $CO_2C_2H_5$ | H | H | Red |
| 16 | $CH_3$ | OH | $CO_2C_2H_5$ | H | H | Orange |
| 17 | $CH_3$ | $SC_2H_4OH$ | $COCH_3$ | H | H | Orange |
| 18 | $CH_3$ | $NHCH(OH)CH_2OH$ | $COC_6H_5$ | H | H | Orange |
| 19 | $CH_3$ | $NHC_2H_4OH$ | $COC_6H_5$ | H | H | Red |
| 20 | $CH_3$ | $NHC_2H_4OH$ | $COCH_3$ | H | H | Red |
| 21 | $CH_3$ | NH—⟨C₆H₄⟩—$C_2H_4OH$ | H | H | H | Red |
| 22 | $CH_3$ | $NHC_2H_4OH$ | $CO_2C_2H_5$ | Br | H | Bluish-Red |
| 23 | $CH_3$ | NH—⟨C₆H₄⟩—$CH_2OH$ | $COC_2H_5$ | $OCH_3$ | H | Red |
| 24 | $CH_3$ | NH—⟨C₆H₄⟩—$OC_2H_4OCCH_3$ (O) | $COCH_3$ | $CH_3$ | H | Red |
| 25 | $CH_3$ | S—⟨C₆H₄⟩—$CH_3$ | $CO_2CH_3$ | H | H | Orange |
| 26 | $CH_3$ | S—⟨C₆H₄⟩—Cl | $CO_2C(CH_3)_3$ | H | H | Orange |

TABLE 1-continued

Substituted 3N—Dibenzo[f,ij]Isoquinoline-2,7-Diones

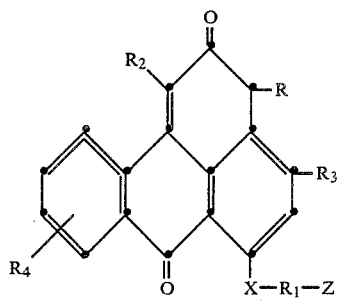

| Ex. No. | R | —X—R$_1$—Z | R$_2$ | R$_3$ | R$_4$ | Color |
|---|---|---|---|---|---|---|
| 27 | CH$_3$ | S—⟨⟩—C(CH$_3$)$_3$ | CO$_2$C$_6$H$_5$ | H | H | Orange |
| 28 | CH$_3$ | NH—⟨⟩ | CO$_2$C$_6$H$_5$ | H | H | Red |
| 29 | CH$_3$ | NH—⟨⟩—CH$_3$ | COOH | H | H | Red |
| 30 | CH$_3$ | NH—⟨⟩—Cl | COCl | H | H | Red |
| 31 | CH$_3$ | NH—⟨⟩(—C$_2$H$_4$OH)(—CH$_2$OH) | OC$_2$H$_5$ | H | H | Red |
| 32 | CH$_3$ | NHC$_2$H$_4$OH | C$_6$H$_5$ | H | H | Red |
| 33 | CH$_3$ | NHCH$_2$CH(CH$_2$)OH | NH$_2$ | H | H | Red |
| 34 | CH$_3$ | NHC$_2$H$_4$OH | CO$_2$C$_4$H$_9$—n | H | 8-CH$_3$ | Red |
| 35 | CH$_3$ | NHCH$_2$CH(OH)CH$_2$OH | CO$_2$CH$_3$ | H | 9-Cl | Red |
| 36 | CH$_3$ | NHCH$_2$CH$_2$CH$_2$CH$_2$CH$_2$OH | COCH$_3$ | H | 11-OCH$_3$ | Red |
| 37 | CH$_3$ | OCH$_3$ | CO$_2$C$_2$H$_5$ | H | H | Orange |
| 38 | CH$_3$ | OH | CO$_2$C$_2$H$_5$ | H | H | Yellow |
| 39 | CH$_3$ | H | NH—⟨⟩—C$_2$H$_4$OH | H | H | Yellow |
| 40 | (CH$_2$)$_2$CH$_3$ | H | NH—⟨⟩—CH$_2$OH | H | H | Yellow |
| 41 | CH$_3$ | NH—⟨S⟩ | SC$_2$H$_4$OH | H | H | Red |
| 42 | CH$_3$CH$_3$ | NHCH$_2$CH$_2$OH | SC$_6$H$_5$ | H | H | Red |
| 43 | CH$_2$CH$_3$ | NHCH$_2$—⟨S⟩—CH$_2$OH | CONH$_2$ | H | H | Red |
| 44 | CH$_3$ | NHCH$_2$—⟨S⟩—CH$_2$OH | COC$_6$H$_5$ | H | H | Red |
| 45 | CH$_3$ | NHCH$_2$—⟨⟩—CH$_2$OH | CN | H | H | Reddish-Blue |

TABLE 1-continued

Substituted 3N—Dibenzo[f,ij]Isoquinoline-2,7-Diones

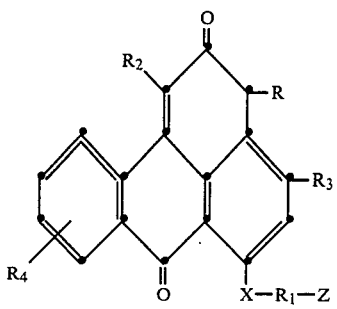

| Ex. No. | R | —X—R₁—Z | R₂ | R₃ | R₄ | Color |
|---|---|---|---|---|---|---|
| 46 | $C_2H_4OH$ | OH | NH—[thiophene ring] | H | H | Yellow |
| 47 | $C_2H_4OH$ | OH | $NHC_4H_9-n$ | H | H | Yellow |
| 48 | $CH_3$ | Br | $CO_2C_2H_5$ | H | H | Greenish-Yellow |
| 49 | $CH_3$ | Cl | $CO_2CH_3$ | H | H | Greenish-Yellow |
| 50 | $CH_3$ | $NHC_2H_4OCCH_3$ (O) | $COC_6H_5$ | H | H | Red |
| 51 | $CH_3$ | $NHC_2H_4OCC_6H_5$ (O) | NC | H | H | Violet |
| 52 | $CH_3$ | $NHC_2H_4OCCH_3$ (O) | NC | H | H | Violet |
| 53 | $CH_3$ | $NHC_2H_4OCOC_2H_5$ (O) | NC | H | H | Violet |
| 54 | $CH_3$ | $NHC_2H_4OCNHC_2H_5$ (O) | $CO_2CH_3$ | H | H | Violet |
| 55 | $CH_3$ | $NH-\text{C}_6H_4-C_2H_4OCC_2H_5$ (O) | $COCH_3$ | H | H | Reddish-Blue |
| 56 | $CH_3$ | $NH-\text{C}_6H_4-SO_2N(C_2H_4OH)_2$ | $COCH_3$ | H | H | Red |
| 57 | $CH_3$ | $NH-\text{C}_6H_4-S-C_2H_4OH$ | $COCH_3$ | H | H | Red |
| 58 | $CH_3$ | $NH-\text{C}_6H_4-O(C_2H_4O)_3H$ | $CO_2CH_3$ | H | H | Red |
| 59 | $CH_3$ | $NH-\text{C}_6H_4-SC_2H_4OH$ | $COCH_3$ | H | H | Red |
| 60 | $CH_3$ | $NH-\text{C}_6H_4-N(CH_2CH_2OH)(SO_2CH_3)$ | $CO_2CH_3$ | H | H | Red |
| 61 | $CH_3$ | $NH-\text{C}_6H_4(OCH_3)(SO_2NHC_2H_4OH)$ | $CO_2C_2H_5$ | H | H | Red |

TABLE 1-continued

Substituted 3N—Dibenzo[f,ij]Isoquinoline-2,7-Diones

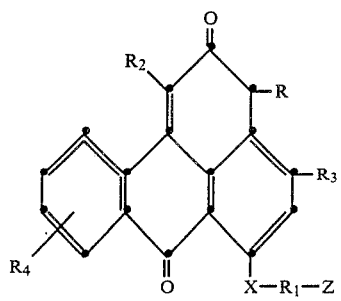

| Ex. No. | R | —X—R₁—Z | R₂ | R₃ | R₄ | Color |
|---|---|---|---|---|---|---|
| 62 | CH₃ | NHCH₂CH₂O—⟨⟩—COOH | CO₂C₂H₅ | H | H | Red |
| 63 | CH₃ | NH—⟨⟩—CH₂CO₂C₆H₅ | CO₂C₆H₅ | H | H | Red |
| 64 | CH₃ | NH—⟨⟩—OCH₂CO₂CH₃ | CO₂CH₃ | H | H | Red |
| 65 | CH₃ | NH—⟨⟩—O—⟨⟩—COOH | CO₂CH₃ | H | H | Red |
| 66 | CH₃ | S—⟨⟩ | CO₂CH₂—⟨⟩ | H | H | Orange |
| 67 | CH₃ | NH—⟨⟩ | CO₂CH₃ | H | H | Red |
| 68 | CH₃ | NH—⟨⟩ | CO₂CH₂CH₂CH₂OCH₃ | H | H | Red |
| 69 | CH₃ | NH—⟨⟩ | CO₂CH₂—⟨S⟩ | H | H | Red |
| 70 | CH₃ | NH—⟨⟩—NHCOCH₃ | CO₂C₂H₅ | H | H | Bluish-Red |
| 71 | CH₃ | NH—⟨⟩—NHSO₂CH₃ | CO₂C₂H₅ | H | H | Bluish-Red |
| 72 | CH₃ | NH—⟨⟩—CONHC₂H₄OH | CO₂C₂H₅ | H | H | Red |
| 73 | CH₃ | NH—⟨⟩(Cl)(Cl) | CO₂C₂H₅ | H | H | Red |
| 74 | CH₃ | NH—⟨⟩—CF₃ | CO₂C₂H₅ | H | H | Red |

TABLE 1-continued
Substituted 3N—Dibenzo[f,ij]Isoquinoline-2,7-Diones

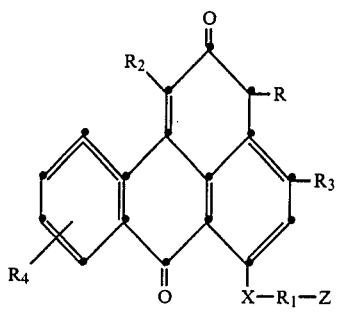

| Ex. No. | R | —X—R₁—Z | R₂ | R₃ | R₄ | Color |
|---|---|---|---|---|---|---|
| 75 | $CH_3$ | NH—(phenyl with OCH₃ and CH₃) | $CO_2C_2H_5$ | H | H | Bluish-Red |
| 76 | $CH_3$ | NH—(phenyl)—$C_2H_4OCCH_3$ (O) | CN | H | H | Reddish-Blue |
| 77 | $CH_3$ | NH—(phenyl)—S—(phenyl)—COOH | CN | H | H | Reddish-Blue |
| 78 | $CH_3$ | $NHC_2H_4NCH_2CH_2OH$ \| $SO_2CH_3$ | CN | H | H | Reddish-Blue |
| 79 | $CH_3$ | $NHC_2H_4NHCOCH_3$ | $CO_2C_2H_5$ | H | H | Red |
| 80 | $CH_3$ | $NHCH_2CH_2CH_2OCH_3$ | $CO_2C_2H_5$ | H | H | Red |
| 81 | $CH_3$ | $NHCH_2C_6H_5$ | $CO_2C_2H_5$ | H | H | Red |
| 82 | $CH_3$ | $NHCH_2CH_2N$(C(O)—CH₂—CH₂CH₂ ring) | $CO_2C_2H_5$ | H | H | Red |
| 83 | $CH_3$ | NH—(phenyl)—$CH_3$ | $CON(C_2H_4OH)_2$ | H | H | Red |
| 84 | $CH_3$ | NH—(phenyl) | $CON(CH_3)C_2H_4OH$ | H | H | Red |
| 85 | $CH_3$ | $NHC_2H_4OH$ | $CON(C_2H_5)_2$ | H | H | Red |

The invention has been described in detail with particular reference to preferred embodiments thereof, but it will be understood that variations and modifications can be effected within the spirit and scope of the invention.

We claim:

1. A composition comprising molding or fiber grade condensation polymer having copolymerized therein a total of from 10 to about 20,000 ppm, of a colorant comprising the reactant residue moieties of one or a mixture of isoquinoline derivative reactants of the formula

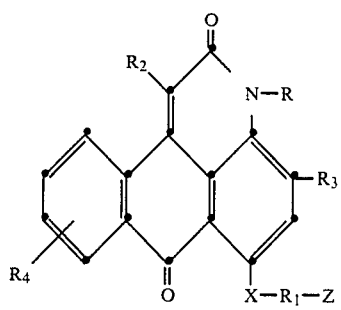

wherein: R is hydrogen, cycloalkyl or alkyl; X is —O—, —S— or —NH—; —X—R$_1$—Z in combination is hydrogen or halogen; R$_1$ is selected from —alkylene—Z, —arylene—Z, —cycloalkylene—Z, —aralkylene—Z, —cycloalkylenealkylene—Z, —alkarylene—Z, —alkylenecycloalkylenealkylene—Z, —alkylenearalkylene—Z, or alkylenecycloalkylene—Z, wherein —Z is selected from hydrogen, —SO$_2$R$^5$, —SO$_2$NR$^5$R$^5$, —NHSO$_2$R$^5$, —N(R$^5$)SO$_2$R$^5$, —N(R$^5$)COR$^5$, —NHCOR$^5$, —OH, —SR$^5$, —OR$^5$, —NHR$^5$, —NR$^5$R$^5$, —SO$_2$NHR$^5$, —CONHR$^5$, —CONR$^5$R$^5$, —OCOR$^5$, —OCO$_2$R$^5$, —OOCNHR$^5$,

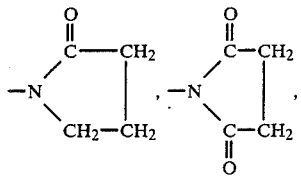

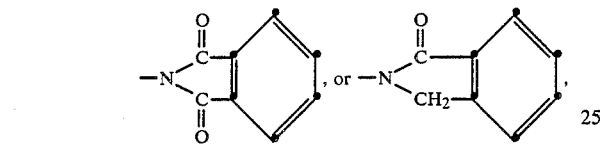

wherein R$^5$ is hydrogen, alkyl, allyl, aryl, cycloalkyl, hydroxyalkyl, alkoxyalkoxyalkyl, alkoxyalkyl, hydroxyalkoxy, hydroxyalkoxyalkoxy, alkoxycarbonylalkyl or carboxyaryl, and when X is —O— or —NH—, —R$_1$—Z in combination also can be hydrogen; R$_2$ is hydrogen, alkyl, aryl, cyano, alkoxycarbonyl, aryloxycarbonyl, aralkoxycarbonyl, cycloalkylalkoxycarbonyl, COCl, carboxy, carbamyl, N-alkylcarbamyl, N,N-dialkylcarbamyl, N-alkyl-N-arylcarbamyl, N-arylcarbamyl, N-cycloalkylcarbamyl, acyl, aroyl, amino, alkylamino, dialkylamino, arylamino, cycloalkylamino, alkoxy, hydroxy, alkylthio or arylthio; each of R$_3$ and R$_4$ is hydrogen, alkyl, halogen or alkoxy; wherein each of the above alkyl, alkylene, aryl, arylene, cycloalkyl or cycloalkylene moieties or portions of a group or radical may be substituted where appropriate with 1–3 substitutents selected from hydroxyl, acyloxy, alkyl, cyano, alkoxycarbonyl, alkoxycarbonyloxy, halogen, alkoxy, hydroxyalkoxy, hydroxyalkyl, aryl, aryloxy, or cycloalkyl; wherein, when the above hydroxyl substituent is absent or when multicondensable groups are desired, at least one of R, R$_2$, R$_3$ or R$_4$ carries one or more condensable groups; and wherein in all of the above definitions the alkyl or alkylene moieties or portions of the various groups contain from 1–8 carbons, straight or branched chain, the aryl or arylene nuclei contain from 4–10 carbons, and the cycloalkyl or cycloalkylene nuclei contain from 4–6 carbons.

2. A composition according to claim 1 wherein: X is —NH— and —R$_1$—Z in combination is aryl, aryl substituted with 1–3 of alkyl, alkoxy, halogen, hydroxyalkyl, hydroxyalkoxy or acylamido, alkyl or alkyl substituted with 1–3 of hydroxyl or acyloxy, cycloalkyl or cycloalkyl substituted with 1–3 of alkyl; X—R$_1$—Z in combination is H; R is alkyl; R$_2$ is alkoxycarbonyl, hydroxyalkylamino, or cyano; and R$_3$ and R$_4$ are each hydrogen.

3. A composition according to claim 1 wherein: X is —NH—; —R$_1$—Z in combination is aryl, aryl substituted with 1–3 of alkyl, alkoxy, halogen, hydroxyalkyl, hydroxyalkoxy or acylamido, alkyl or alkyl substituted with 1–3 of hydroxyl or acyloxy, cycloalkyl or cycloalkyl substituted with 1–3 of alkyl; R is alkyl; R$_2$ is hydrogen, cyano, acyl, aroyl, alkoxy, alkylthio or arylthio; and R$_3$ and R$_4$ are each hydrogen.

4. A composition according to claim 1 wherein the colorant has the formula

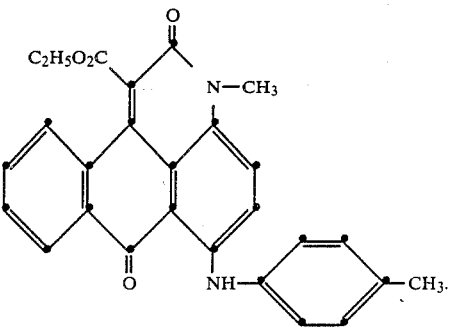

5. A composition according to claim 1 wherein the colorant has the formula

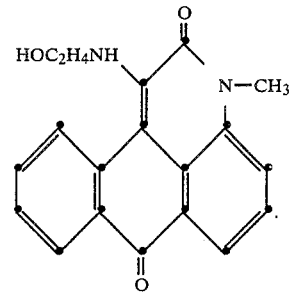

6. A composition according to claim 1 wherein the colorant has the formula

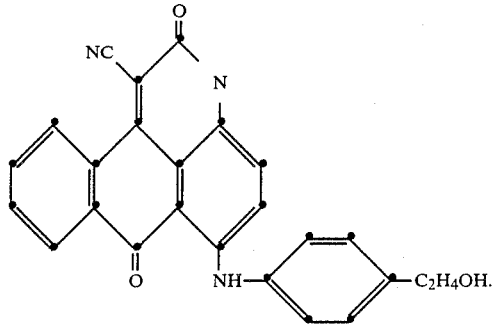

7. A composition of any of claims 1–6 wherein the colorant is present in concentrations between about 20 to about 5,000 ppm.

8. A formed article of a composition of any of claims 1–6.

9. A composition of any of claims 1–6 wherein the polymer is linear polyester wherein the acid moiety is comprised of at least about 50 mol % terephthalic acid residue, and the glycol moiety at least about 50 mol % ethylene glycol or 1,4-cyclohexanedimethanol residue, and containing a total of from about 20 to about 5,000 ppm of one or a mixture of the colorant.

10. A composition of any of claims 1–6 wherein the polymer is linear polyester comprised of from about 75 to 100 mol % terephthalic acid residue and from about 75 to 100 mol % ethylene glycol residue.

11. A formed article of a composition of claim 9.

12. A formed article of a composition of claim 10.

* * * * *

UNITED STATES PATENT AND TRADEMARK OFFICE
CERTIFICATE OF CORRECTION

PATENT NO. : 4,740,581

DATED : April 26, 1988

INVENTOR(S) : Wayne P. Pruett, Samuel D. Hilbert, Max A. Weaver

It is certified that error appears in the above-identified patent and that said Letters Patent is hereby corrected as shown below:

Page 1, column 2 of the abstract, 3rd line from the bottom of the page, delete "Rhd 2," and insert ——$R_2$,——.

Column 7, lines 34-47, the structure should read

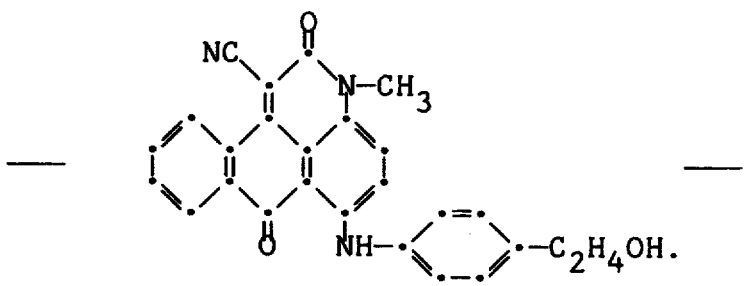

UNITED STATES PATENT AND TRADEMARK OFFICE
CERTIFICATE OF CORRECTION

PATENT NO. : 4,740,581
DATED : April 26, 1988
INVENTOR(S) : Wayne P. Pruett, Samuel D. Hilbert, Max A. Weaver It is certified that error appears in the above-identified patent and that said Letters Patent is hereby corrected as shown below:

Column 20, lines 37-50, the structure should read

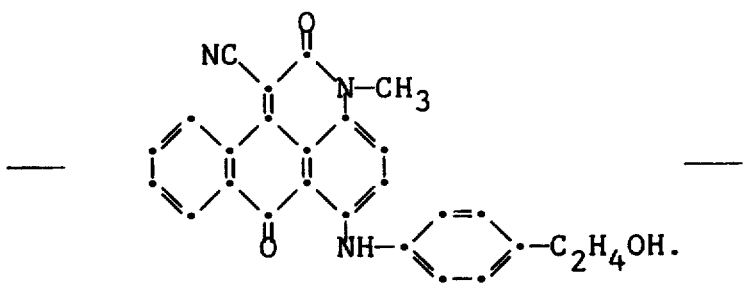

Signed and Sealed this

Sixth Day of December, 1988

Attest:

DONALD J. QUIGG

Attesting Officer

Commissioner of Patents and Trademarks